United States Patent [19]
Kilmer

[11] 3,983,426
[45] Sept. 28, 1976

[54] METHOD AND MEANS OF UTILIZING MAGNETISM TO ACHIEVE ROTATION OF A DRIVE SHAFT

[76] Inventor: Charles L. Kilmer, 2221-23 Jones St., Omaha, Nebr. 68102

[22] Filed: Apr. 28, 1975

[21] Appl. No.: 571,999

[52] U.S. Cl. .................................................. 310/46
[51] Int. Cl.² ........................................ H02K 37/00
[58] Field of Search ............. 310/46, 152, 156, 112, 310/114, 126

[56] References Cited
UNITED STATES PATENTS

| | | | |
|---|---|---|---|
| 1,863,294 | 6/1932 | Bogia | 310/46 |
| 2,907,903 | 10/1959 | Reijnst et al. | 310/156 |
| 3,665,227 | 5/1972 | Busch | 310/46 |
| 3,670,189 | 6/1972 | Monroe | 310/46 |
| 3,678,359 | 7/1972 | Peterson | 310/46 X |
| 3,681,632 | 8/1972 | Sliger | 310/46 |
| 3,895,245 | 7/1975 | Bode | 310/46 |

*Primary Examiner*—Donovan F. Duggan
*Attorney, Agent, or Firm*—Zarley, McKee, Thomte, & Voorhees

[57] ABSTRACT

A means for imparting rotational movement to a drive shaft comprising a support frame having the drive shaft rotatably mounted thereon. A plurality of magnet supports are secured to the drive shaft in a spaced apart and staggered relationship. Each of the supports has a plurality of radially spaced permanent magnets operatively secured thereto with each of the magnets having a positive pole on one side thereof and a negative pole on the other side thereof. A plurality of air-core solenoids are mounted on the support frame in a spaced apart relationship and are positioned relative to the support frame so that the permanent magnets on one of the supports will rotate past one of the solenoids in close proximity thereto. A distributor means is operatively mechanically connected to the drive shaft so that rotation of the drive shaft will cause the distributor means to be actuated. The distributor is electrically connected to a source of electrical energy. The distributor is also electrically connected to the solenoids so that actuation of one of the solenoids will cause the flux emanating from one side of the core of the solenoid to repel one of the magnets on one of the supports and so that the flux emanating from the other side of the core of the said solenoid will attract one of the magnets on the support to impart rotational movement to the drive shaft. The method of utilizing magnetism to achieve continuous rotation of the drive shaft is also disclosed and generally involves the repelling and attracting forces of the three-poled magnetic field which acts upon a mechanical apparatus to produce a continuous reaction from the mechanical apparatus.

4 Claims, 8 Drawing Figures

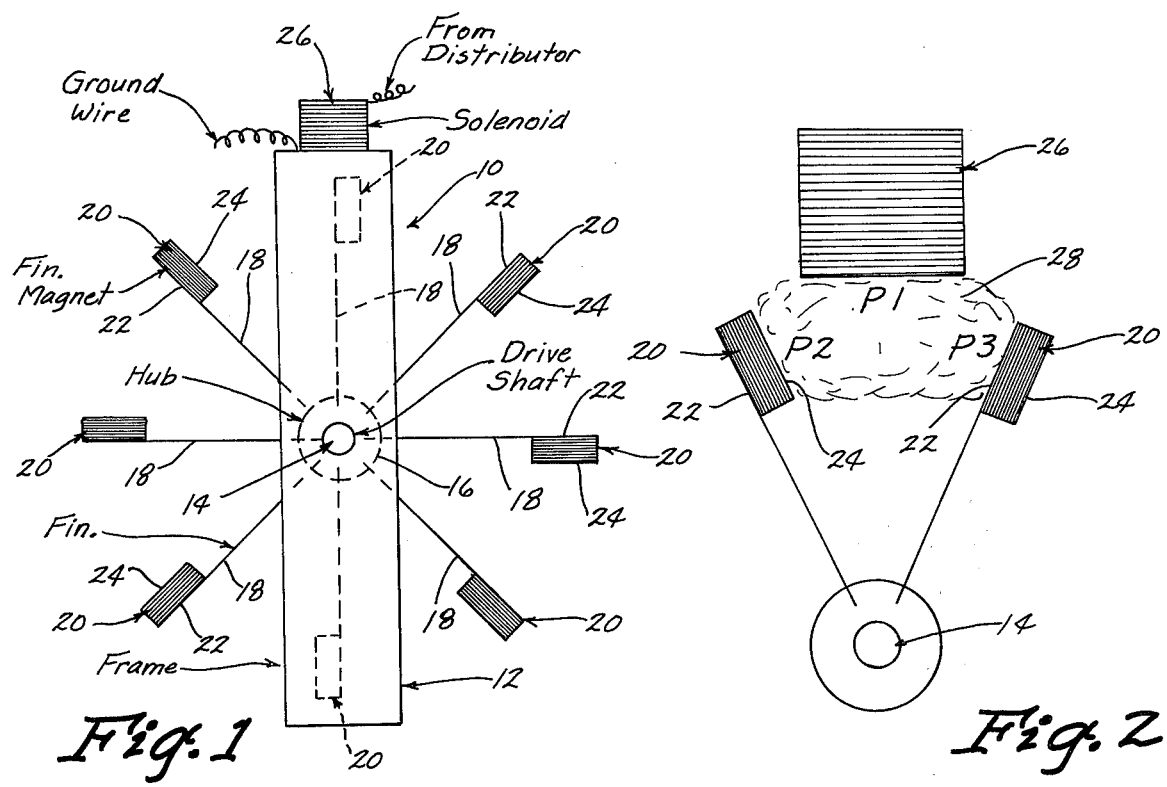
Fig. 1
Fig. 2
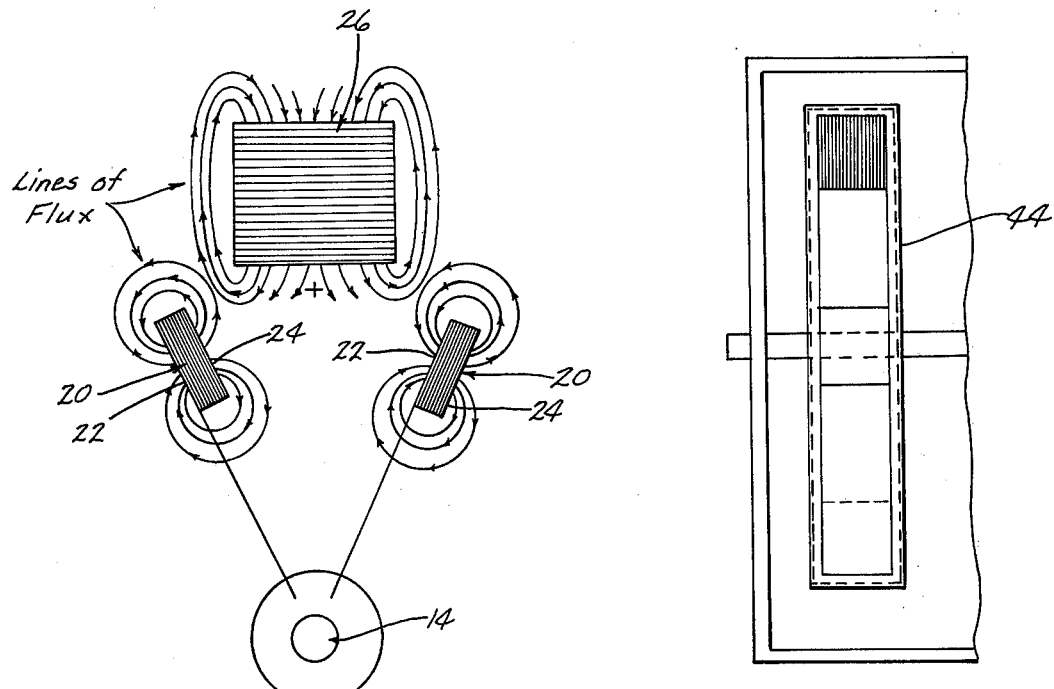
Fig. 3
Fig. 4

METHOD AND MEANS OF UTILIZING MAGNETISM TO ACHIEVE ROTATION OF A DRIVE SHAFT

BACKGROUND OF THE INVENTION

This invention relates to a method and means for imparting rotational movement to a drive shaft and more particularly to a method and means for utilizing magnetism in a manner which will achieve continuous rotation of a drive shaft.

It is a primary purpose of this invention to provide an economical method and means for causing the rotation of a drive shaft.

A further principal object of the invention is to provide a method and means for imparting rotational movement to a drive shaft which requires very little energy input while achieving substantial energy output.

A further object of the invention is to provide a method and means for imparting rotational movement to a drive shaft which is economical of manufacture, durable in use, and refined in appearance.

BRIEF DESCRIPTION OF THE DRAWINGS

FIG. 1 is a front view of the device of this invention;

FIG. 2 is a partial front fragmentary view of the device illustrating the relationship of the three-poled magnetic field;

FIG. 3 is a schematic view illustrating the position of the lines of flux with regard to the solenoid and a pair of adjacent permanent magnets;

FIG. 4 is a partial side view illustrating directly opposite fin magnets belted together with a metal strap;

DESCRIPTION OF THE PREFERRED METHOD AND MEANS

Figure 5:
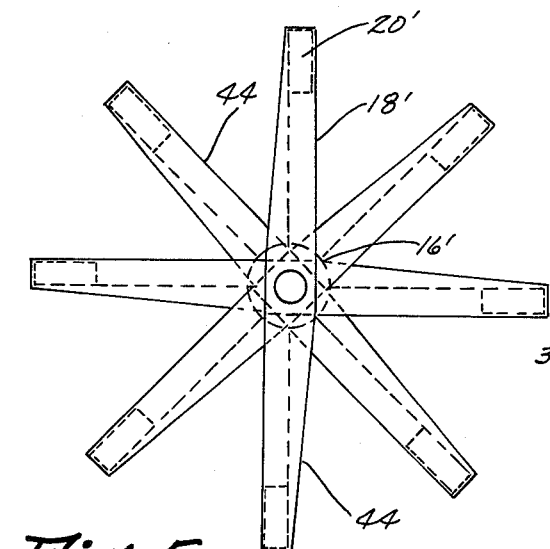
FIG. 5 is a front view illustrating a single hub having eight fins and fin magnets which are wrapped with metal straps.

The device of this invention is referred to generally by the reference numeral 10 and generally comprises a suitable frame 12 having a drive shaft 14 rotatably mounted thereon by any convenient means. A plurality of hubs 16 are secured to the shaft 14 in a spaced apart relationship along the length thereof. The number of the hubs 16 is optional but it is preferred that at least six of the hubs be utilized.

Figure 8:
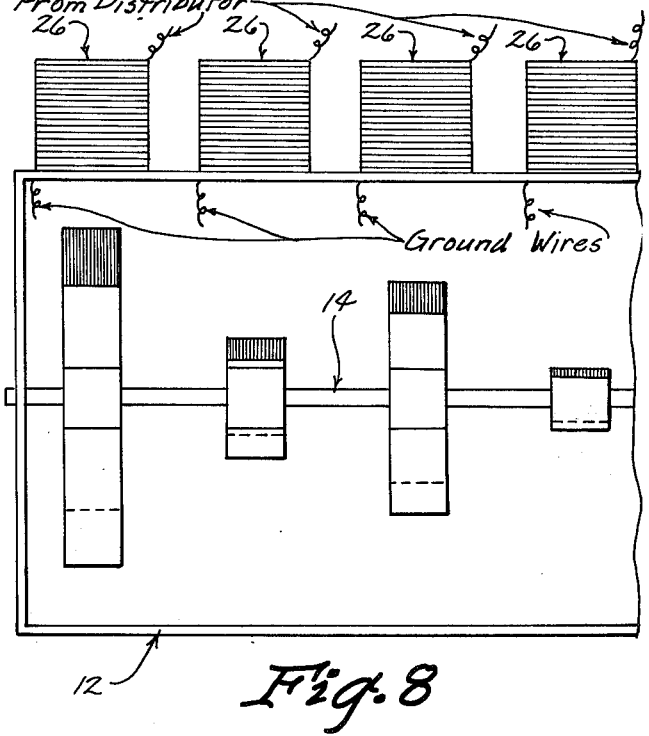
FIG. 8 is partial side view of the device of this invention illustrating alternately staggered fins having permanent magnets attached.

Each of the hubs 16 has a plurality of fins or supports 18 extending radially outwardly therefrom in a spaced relationship. A permanent magnet 20 is secured to the outer end of each of the fins or supports 18 as illustrated in the drawings. The permanent magnets must be poled through the thickness so that a positive pole is provided at one side of the magnet and so that a negative pole is provided at the other side of the magnet. FIG. 3 illustrates the lines of flux emanating from the magnets 20. For purposes of description, each of the magnets 20 will be described as having sides 22 and 24. For purposes of description also, side 22 will be assumed to be the positive pole while side 24 will be assumed to be the negative pole. The numeral 26 refers to conventional air-core solenoids which are secured to the frame 12 in a spaced apart relationship such as illustrated in FIG. 8 so that the magnets on each of the supports 18 wll rotate past the solenoids 26 in close proximity thereto as illustrated in FIG. 3. FIG. 3 also illustrates the flux lines of the solenoid. Briefly, the effective flux emanating from one side of the core of the air-core solenoid 26 acts upon side 24 of image 20 to repel the leading magnet 20 (FIG. 3) while simultaneously attracting side 22 of the trailing magnet 20 thus causing the trailing magnet and support to follow simultaneously. Because of the design of the mechanical apparatus depicted in the visual explanation, the reaction of the mechanical apparatus is equal to the square of the force acting upon the mechanical apparatus when frictional resistance is ignored If the magnetic poles of the apparatus in FIG. 3 were all reversed, there would be no change in the reaction of the mechanical apparatus. If the magnetic poles of only the solenoid were to be reversed, the mechanical apparatus would move in an opposite direction. If the poles of the fin magnets were reversed, the mechanical apparatus would react in an opposite manner.

With respect to FIG. 2, the numeral 28 refers generally to the energy field of the three-poled magnetic field. As illustrated in FIG. 2, P.1 repels P.2 and at the same instant in time P.1 attracts P.3. The repelling and attraction described causes the drive shaft to turn. When a series of three-poled magnetic fields are arranged in a staggered alignment as illustrated in FIG. 8, the drive shaft will rotate continuously.

Figure 6:
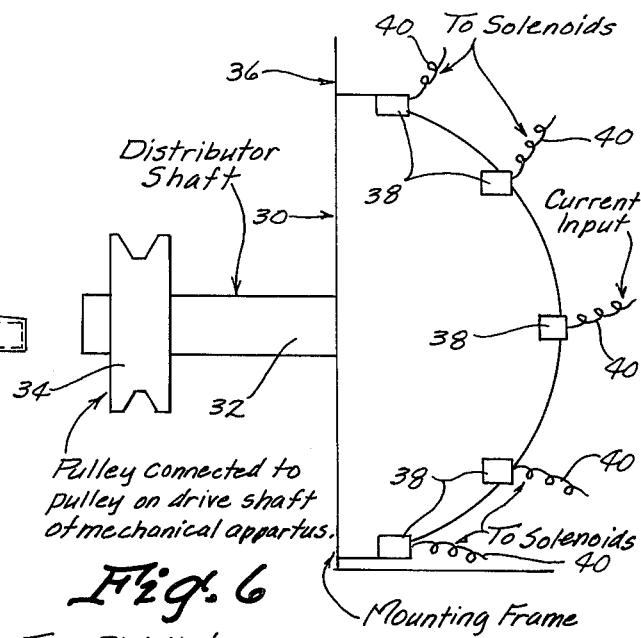
FIG. 6 is a schematic view illustrating the means for operating the distributor of this invention.
Figure 7:
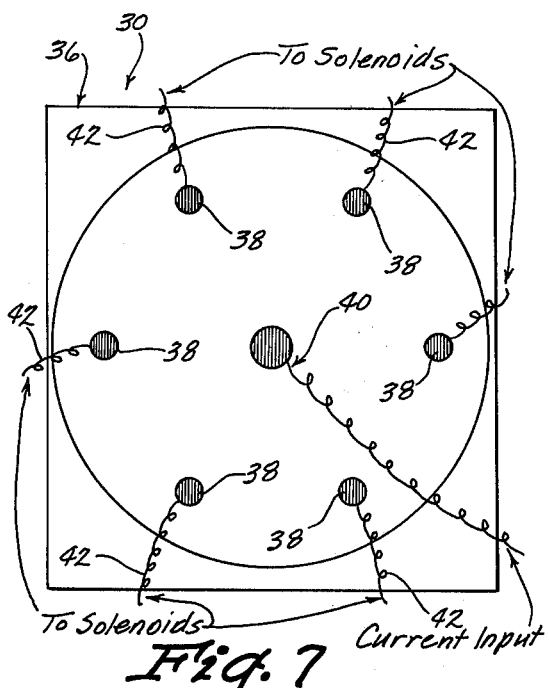
FIG. 7 is a schematic view illustrating one form of a distributor for energizing six air-core solenoids.

FIG. 6, 7 and 8 illustrate one means of energizing or activating the solenoids 26. In FIG. 6, the numeral 30 refers generally to a distributor having a distributor shaft 32 and a pulley 34 mounted thereon. Distributor also includes a mounting frame 36. Pulley 34 is connected to a suitable pulley on drive shaft 14 so that rotation of drive shaft 14 causes the rotation of pulley 34 and shaft 32. As shaft 32 is rotated, the rotor of the distributor causes a pulse of D-C current to be sent to the proper solenoid at the proper time. In FIG. 6, six contacts 38 are shown for illustrative purposes only with the understanding that the number of contacts 38 would correspond with the number of solenoids employed on the apparatus. In FIG. 6, the numeral 40 refers generally to a means for supplying electrical energy to the distributor in conventional fashion. FIG. 7 also illustates the distributor and illustrates six output connections or contacts 38. The number of solenoids on the mechanical apparatus. The output 38 are connected to the solenoids 26 by leads or wires 42.

FIG. 5 illustrates the modified form of the hub and is referred to generally by the reference numeral 16'. Hub 16' is provided with eight fins or supports 18' extending therefrom and having magnets 20' mounted thereon. The fins 18' and magnets 20' are wrapped with metal centripetal straps 44 which are also shown in FIG. 4. FIG. 4 is a side view which shows directly opposite fin magnets belted together with the strap 44. Because of the extremely high potential angular velocity of the rotating portion of the mechanical apparatus, a problem involving centrifugal force arises. Inasmuch as the magnetic flux travels at the speed of light, the pulse of magnetic flux emanating from the solenoid will ram into the magnetic field surrounding the permanent magnets attached to the fins while traveling at the speed of light. In other words, the permanent magnets will move as fast as they are pushed or pulled. The metal straps 44 act to create a stationary centripetal force to partially offset the centrifugal force. The term "stationary" must be used because centripetal force will not increase with an increased centrifugal force as the angular velocity of the mechanical apparatus increases.

In summary, it can be seen that a novel method and means has been provided wherein the effective flux emanating from one side of the core of solenoid acts upon the lead magnet attached to the fin causing the fin to move. At the same instant, the flux emanating from the opposite side of the core of the solenoid is acting upon the trailing magnet in an opposite manner thereby causing the trailing fin to move simultaneously. When a pulse of D-C curent is made to flow alternately through a series of solenoids associated with a staggered series of hubs and fins and fin magnets, a continuous rotation is obtained from the drive shaft. The phenomena described is best seen in FIG. 3 and is the proper "firing" position of the solenoid 26 with respect to a lead and trailing magnet. As stated, the fins on adjacent hubs may be staggered linearly or alternately. Only one pair of fin magnets on a given hub is acted up by a pulse of magnetic flux emanating from a solenoid at any given instant in time. At this instant in time, the other sets of hubs, fins, and fin magnets act as fly wheels.

Thus it can be seen that the method and means accomplishes all of its stated objectives.

I claim:
1. A device of the class described, comprising,
   a support means,
   a drive shaft rotatably mounted on said support means,
   a plurality of magnet supports secured to said drive shaft in a spaced-apart and staggered relationship,
   each of said supports having a plurality of radially spaced permanent magnets operatively secured thereto,
   each of said magnets having a positive pole on one side thereof and a negative pole on the other side thereof, the magnetic north-south polar axis of each magnet aligned substantially radially to said drive shaft axis,
   a plurality of air-core solenoids mounted on said support means in a spaced-apart relationship and being positioned relative to said supports whereby the permanent magnets on one of said supports will rotate past one of said solenoids in close proximity thereto, said solenoids being disposed longitudinally with respect to the longitudinal axis of said shaft,
   said staggered relationship of said supports causing the permanent magnets on supports to be radially offset with respect to each other,
   a distributor means operatively mechanically connected to said drive shaft whereby rotation of said drive shaft will cause said distributor means to be actuated,
   means electrically connecting said distributor means to a source of electrical energy,
   and means electrically connecting said distributor means with said solenoids whereby the actuation of one of said solenoids will cause the flux emanating from one side of the core of the solenoid to repel one of said magnets on said one support and whereby the flux emanating from the other side of the core of said solenoid will simultaneously attract one of said magnets on said one support to impart rotation to said drive shaft.

2. The method of imparting rotational movement to a drive shaft, comprising the following steps:
   providing a rotatable drive shaft having a plurality of spaced-apart hubs mounted thereon, each of said hubs having a plurality of radially spaced permanent magnets provided thereon having a negative pole on one side thereof and a positive pole on the other side thereof, radially offsetting the magnets on each of said hubs with respect to each other,
   providing a plurality of electrically operated air-core solenoids, positioning said solenoids so that the magnets on one said hubs will rotate thereby in close proximity thereto,
   energizing each of said solenoids in a predetermined sequence and at a predetermined time whereby the solenoid so energized will repel one of said magnets on the associated hub and will simultaneously attract the adjacent magnet on the associated hub to cause the rotation of said shaft.

3. The method of claim 2 wherein direct current is supplied to said solenoids.

4. The method of claim 2 wherein a distributor means is provided which is mechanically connected to said drive shaft, the method also comprisingthe step electrically connecting the distributor means to said solenoids so that actuation of said distributor means by said drive shaft causes pulses of electrical energy to be supplied to said solenoids in said predetermined sequence and at said predetermined time.

* * * * *